United States Patent
Kim et al.

(10) Patent No.: US 8,189,546 B2
(45) Date of Patent: May 29, 2012

(54) DATA TRANSMISSION/RECEPTION METHOD FOR MULTICAST AND BROADCAST SERVICE IN BROADBAND WIRELESS ACCESS SYSTEM

(75) Inventors: Sung-Kee Kim, Suwon-si (KR); Do-In Choi, Yongin-si (KR); Yong-Gyoo Kim, Seoul (KR); Seong-Taek Hwang, Pyeongtaek-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 916 days.

(21) Appl. No.: 11/946,985

(22) Filed: Nov. 29, 2007

(65) Prior Publication Data

US 2008/0130602 A1    Jun. 5, 2008

(30) Foreign Application Priority Data

Dec. 1, 2006    (KR) .................. 10-2006-0120847

(51) Int. Cl.
  *H04W 4/00* (2009.01)
(52) U.S. Cl. ...................... 370/338; 370/235
(58) Field of Classification Search .................. None
See application file for complete search history.

(56) References Cited

U.S. PATENT DOCUMENTS

| | | | |
|---|---|---|---|
| 6,055,242 A * | 4/2000 | Doshi et al. .................. 370/458 |
| 6,363,257 B1 * | 3/2002 | Warwick .................. 455/511 |
| 6,615,382 B1 * | 9/2003 | Kang et al. .................. 714/748 |
| 7,746,882 B2 * | 6/2010 | Vedantham et al. .................. 370/414 |
| 2002/0118666 A1 * | 8/2002 | Stanwood et al. .................. 370/345 |
| 2005/0159163 A1 * | 7/2005 | Chang et al. .................. 455/450 |
| 2006/0007953 A1 * | 1/2006 | Vesma et al. .................. 370/466 |
| 2006/0029011 A1 * | 2/2006 | Etemad et al. .................. 370/311 |
| 2006/0048036 A1 * | 3/2006 | Miura et al. .................. 714/758 |
| 2006/0075321 A1 * | 4/2006 | Vedantham et al. .................. 714/776 |
| 2006/0107189 A1 * | 5/2006 | Wenger et al. .................. 714/776 |
| 2006/0245488 A1 * | 11/2006 | Puputti et al. .................. 375/238 |
| 2006/0253763 A1 * | 11/2006 | Oliva et al. .................. 714/746 |
| 2006/0268726 A1 * | 11/2006 | Alamaunu et al. .................. 370/242 |
| 2007/0074264 A1 * | 3/2007 | Vesma et al. .................. 725/135 |
| 2007/0130495 A1 * | 6/2007 | Yoon et al. .................. 714/758 |
| 2007/0177627 A1 * | 8/2007 | Raju et al. .................. 370/469 |
| 2007/0281757 A1 * | 12/2007 | Iguchi et al. .................. 455/574 |
| 2008/0117996 A1 * | 5/2008 | Kim et al. .................. 375/261 |
| 2008/0288986 A1 * | 11/2008 | Foster et al. .................. 725/62 |
| 2009/0055715 A1 * | 2/2009 | Jashek et al. .................. 714/776 |
| 2009/0089535 A1 * | 4/2009 | Lohmar et al. .................. 711/173 |
| 2009/0259920 A1 * | 10/2009 | Guo et al. .................. 714/776 |
| 2009/0327842 A1 * | 12/2009 | Liu et al. .................. 714/776 |
| 2010/0218074 A1 * | 8/2010 | Fang et al. .................. 714/776 |

FOREIGN PATENT DOCUMENTS

KR    2002-53403    7/2002

(Continued)

*Primary Examiner* — Bunjob Jaroenchonwanit
(74) *Attorney, Agent, or Firm* — Cha & Reiter, LLC

(57) ABSTRACT

Disclosed is a data transmission method for an MBS in a broadband wireless access system. The method includes the steps of constructing a Wibro frame by adding an FEC zone to a downlink portion of the Wibro frame by a radio access station, the FEC zone containing an FEC packet for performing a packet-based FEC scheme; and transmitting data to a plurality of mobile stations by the radio access station, the Wibro frame constructing the data.

6 Claims, 6 Drawing Sheets

FOREIGN PATENT DOCUMENTS

| | | |
|---|---|---|
| KR | 2003-93592 | 12/2003 |
| KR | 2004-33664 | 4/2004 |
| KR | 2005-17046 | 2/2005 |
| KR | 2005-73114 | 7/2005 |
| KR | 2006-116032 | 11/2006 |

* cited by examiner

DATA TRANSMISSION/RECEPTION METHOD FOR MULTICAST AND BROADCAST SERVICE IN BROADBAND WIRELESS ACCESS SYSTEM

CLAIM OF PRIORITY

This application claims the benefit under 35 U.S.C. §119 (a) of an application entitled "Data Transmission/Reception Method for Multicast & Broadcast Service in Broadband Wireless Access System," filed in the Korean Intellectual Property Office on Dec. 1, 2006 and assigned Serial No. 2006-120847, the contents of which are hereby incorporated by reference.

BACKGROUND OF THE INVENTION

1. Field of the Invention

The present invention relates to a broadband wireless access system, such as WiBro (Wireless Broadband), and more particularly to a data transmission/reception method for compensating for a packet loss occurring in a wireless channel in an environment, which provides a multicast & broadband service (hereinafter, referred to as MBS) based on a broadband wireless access system.

2. Description of the Related Art

A broadband wireless access system (e.g. Wibro) refers to an IP (Internet Protocol)-based wireless data transmission system using OFDMA/TDD (Orthogonal Frequency Division Multiple Access/Time Division Duplex)-type wireless transmission technology, which features upward/downward asymmetric transmission. In addition to a voice service, the broadband wireless access system supports a combined multimedia application service, including various low/high-speed data services, high-quality moving images, etc. Such a broadband wireless access system enables access to PSTN (Public Switched Telephone Network), PSDN (Public Switched Data Network), IMT-2000 (International Mobile Telecommunication-2000) network, Internet, or ATM (Asynchronous Transfer Mode) network in a mobile or stationary environment based on a wireless medium using a broadband (e.g. 2 GHz, 5 GHz, 26 GHz, or 60 GHz), and supports a channel transmission rate of 2 Mbps or higher.

The broadband wireless access system provides not only voice and packet data communication services, which have been available from conventional communication systems, but also high-speed multimedia communication services, such as an MBS, to users. Particularly, when a communication system provides an MBS, its transmitter, e.g. RAS (Radio Access Station), transmits (i.e. multicasts) the same data (i.e. broadcasting contents) to a number of receivers, e.g. MSs (Mobile Stations).

The frame structure of a conventional Wibro system will now be described with reference to FIG. 1. In a Wibro system, a frame must be processed within 5 ms and is temporally divided into a DL (Downlink), a TTG (Transmit/receive Transition Gap), a UL (Uplink), and an RTG (Receive/transmit Transition Gap). A portion of the frame is allocated to the DL, and another portion is allocated to the UL. The TTG and RTG between the DL and the UL provide the system with time for transition into the CL and DL. In FIG. 1, the vertical axis of the frame refers to an OFDM subcarrier, and the horizontal axis refers to an OFDM symbol.

The multicasting zone shown in FIG. 1 refers to a portion of the DL allocated for multicasting. Particularly, the multicasting zone is used to transmit broadcasting data and provides an MBS. The DL_MAP (Downlink_MAP) shown in FIG. 1 contains information regarding which data is transmitted via which zone inside the DL. In addition, the DL_MAP contains information regarding the position of the multicasting zone in the Wibro frame. The MBS_MAP (Multicast Broadcast Service_MAP) shown in FIG. 1 is positioned within the multicasting zone and contains information regarding the transmission cycle of MBS data, the data coding mode, and the physical layer for data transmission.

FIG. 2 shows an exemplary transmission scheme of frames from an RAS to an MS in a conventional Wibro system. Particularly, FIG. 2 shows exemplary cycles of the transmission of broadcasts A, B, and C via frames in a Wibro system. It is clear from FIG. 2 that broadcast A is transmitted every frame; broadcast B is transmitted every second frame; and frame C is transmitted every third frame. Such transmission cycles are described in MBS_MAP shown in FIG. 1. Data is encapsulated in an IP packet for each broadcast and transmitted. Each IP packet is transmitted via a frame.

Considering the current wireless communication technology, the low reliability of wireless channels makes any control regarding packet losses impossible. In the case of normal data, which has no real-time properties, the receiver may request the retransmission of a lost packet. However, in the case of a broadcast having real-time properties, retransmission is possible only when the roundtrip time is short and the receiving buffer has a large size. In addition, due to the nature of an MBS service, i.e. because a transmitter transmits the same data to a number of receivers, it is impractical to retransmit a lost packet of a specific user. Further, a packet loss occurring in a wireless channel directly degrades the screen quality, which needs to be compensated for.

Current wireless communication services show drastic differences between a daytime period with many users and a nighttime period with few users. Therefore, a wireless communication service provided by Qualcomm Inc., "Media-FLO," has introduced a service named "ClipCasting" in an attempt to efficiently use the bands, which are not used during the nighttime period. According to this service "ClipCasting," a user can designate desired moving image clips in advance, and the designated contents are automatically downloaded to the user's terminal during an idle period, e.g. during the nighttime period, so that the user can watch the stored contents. This service enables users an efficient use of wireless bands with little cost at night. However, such a service has a problem in that, even when contents are downloaded to the terminal at night to be watched at a later time, packet losses may still exist in wireless channel environments. When a multicasting service (e.g. broadcast) is downloaded at night, retransmitting of the lost packets is not easy. It is far more difficult for a receiver to automatically secure a separate unicasting channel and receive the lost packets only. As a result, packet losses occurring in wireless channels degrade the screen quality.

SUMMARY OF THE INVENTION

Accordingly, the present invention has been made to solve the above-mentioned problems occurring in the prior art and provides additional advantages, by providing a data transmission/reception method for an MBS in a broadband wireless access system, wherein packet losses occurring in wireless channels are compensated for.

In accordance with an aspect of the present invention, a data transmission method for an MBS in a broadband wireless access system includes: constructing a Wibro frame by adding an FEC zone to a downlink portion of the Wibro frame by a radio access station, the FEC zone containing an FEC packet for performing a packet-based FEC scheme; and transmitting data to a number of mobile stations by the radio access station, the Wibro frame constructing the data.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Figure 1:
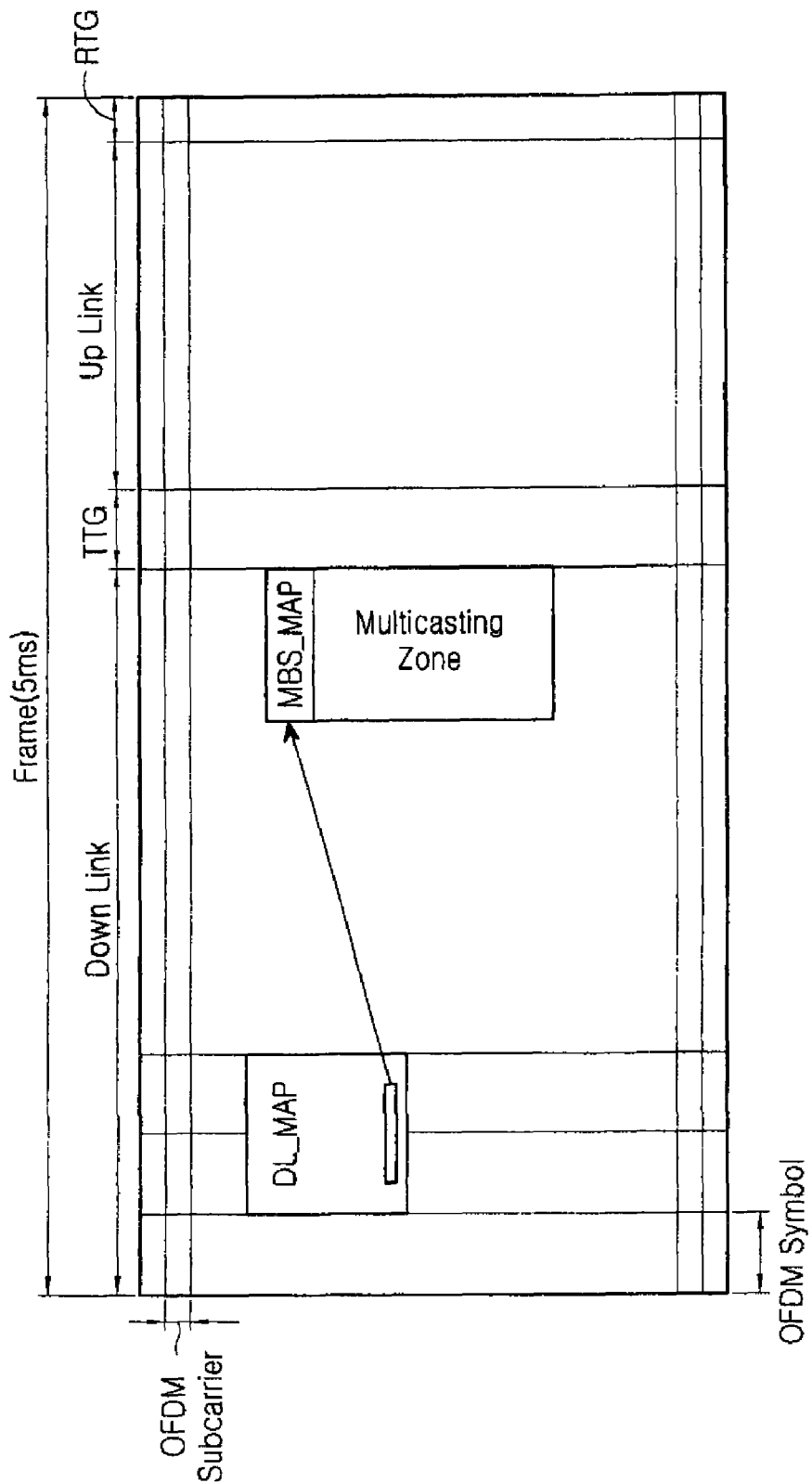
FIG. 1 shows an exemplary frame structure in a conventional Wibro system.

Hereinafter, exemplary embodiments of the present invention will be described with reference to the accompanying drawings. In the following description, the same elements will be designated by the same reference numerals although they are shown in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. For the purposes of clarity and simplicity, a detailed description of known functions and configurations incorporated herein will be omitted as it may make the subject matter of the present invention unclear.

Figure 3:
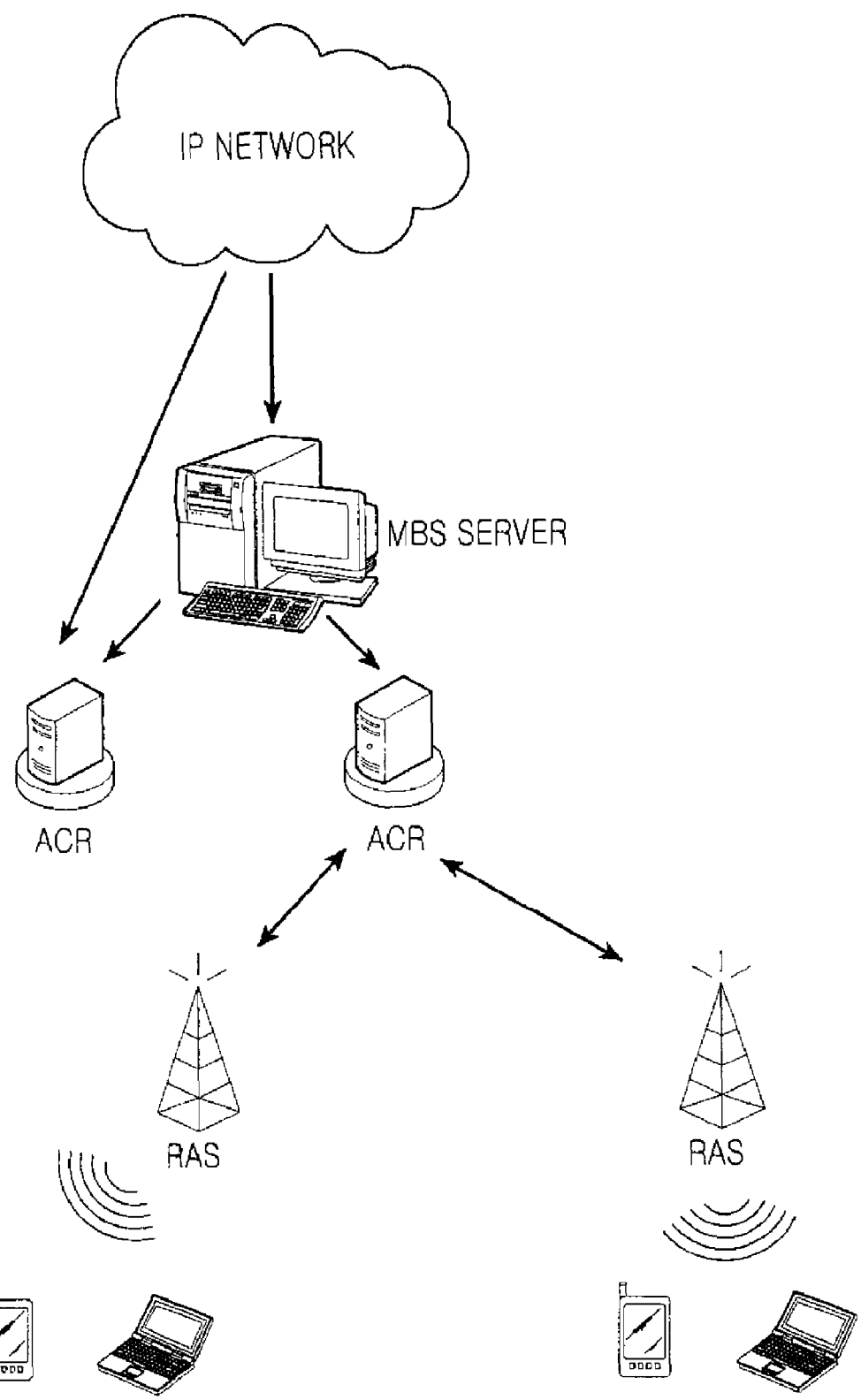
FIG. 3 shows the overall construction of a Wibro system to which the present invention is applied.

A Wibro system, to which the present invention is applied, will now be described with reference to FIG. 3, which shows the overall construction of the system. As shown, the Wibro system includes a number of RASs (Radio Access Stations) and ACRs (Access Control Routers) connected to a network so as to control the RASs.

Each ACR has a service zone (i.e. cell) allocated thereto and provides services to a number of MSs (Mobile Stations) located in the cell. An MBS server, which is superior to the ACRs, provides contents to MSs desiring an MBS (Multicast & Broadcast Service). The MBS server or a specific ACR may interwork with an IP network.

The Wibro system may further include a home agent (not shown) for supporting IP mobility of MSs in a home network, and an AAA (Authentication, Authorization, and Accounting) server adapted for authentication, authorization, and accounting with regard to users and MSs, in order to provide network access and services to authorized users only.

The present invention proposes a method for data transmission/reception between a transmitter in charge of a service zone in a Wibro system, e.g. an RAS, and a receiver adapted to receive an MBS from the transmitter, e.g. an MS compatible with both stationary and mobile environments.

In the Wibro system, each broadcast data is encapsulated in an IP packet and transmitted via Wibro frames. An IP packet loss may occur when a Wibro frame is lost or damaged in a wireless channel, or when a bit error cannot be corrected by MAC (Media Access Control) and the corresponding packet is discarded.

A method of correcting such a packet loss has been devised, and is referred to as packet-based FEC (Forward Error Correction). Although the conventional FEC corrects bit errors, the packet-based FEC can entirely recover lost packets.

Figure 4:
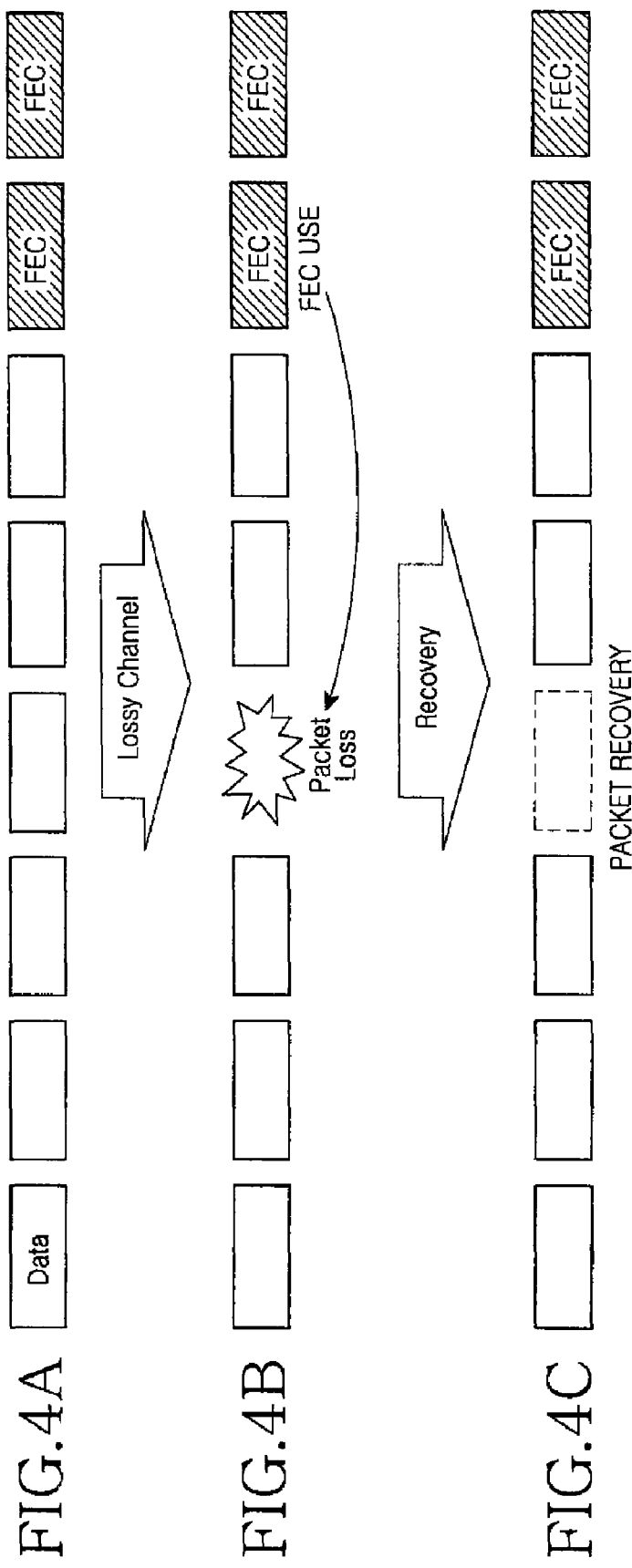
FIG. 4 shows an exemplary operation principle of a packet-based FEC.

FIG. 4 shows an exemplary operation principle of the packet-based FEC. In FIG. 4, (a) corresponds to transmission of broadcast data for an MBS, particularly data packets, from a transmitter to a receiver together with FEC packets for correcting packet errors; (b) corresponds to use of an FEC packet when a data packet is lost during the transmission of broadcast data via a wireless channel; and (c) corresponds to recovery of the lost data packet by using an FEC packet. As exemplified in FIG. 4, the packet-based FEC guarantees that, when a data packet is lost during the transmission via a wireless channel, the receiver can recover the lost data packet using an FEC packet. The number of recoverable packets depends on the adopted FEC algorithm or the overhead ratio (ratio of data packets to FEC packets).

When the packet-based FEC is used, the transmission of additional packets requires that the wireless network have additional bands. However, this requirement is compromised by the fact that the probability of packet loss in the wireless channel is decreased and that, as in the case of "ClipCasting" provided by "MediaFLO," free bands can be used, when there are few users, to transmit multimedia data in real time without using additional bands. This guarantees a better service.

Figure 5:
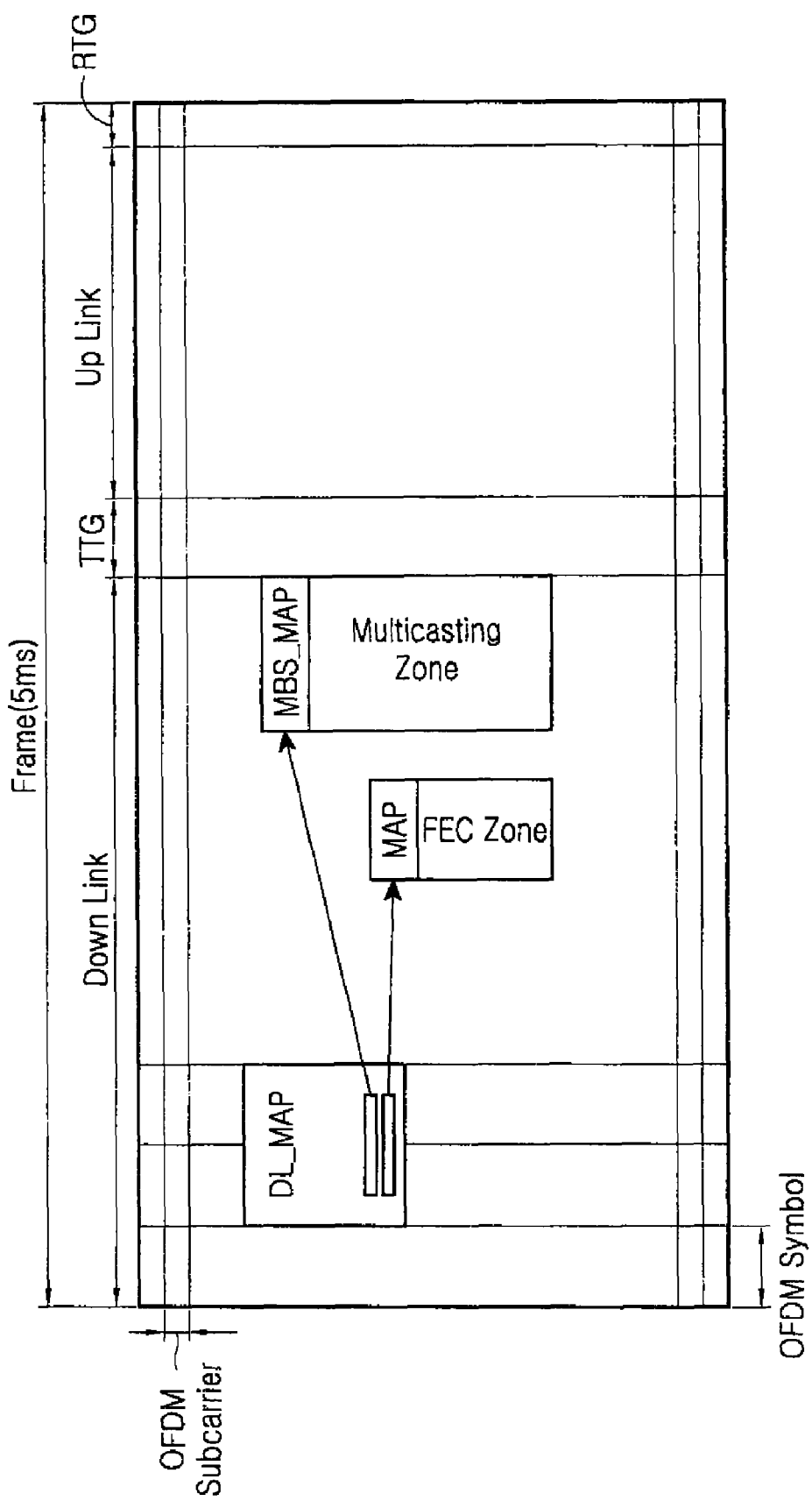
FIG. 5 shows a frame structure in a Wibro system according to an embodiment of the present invention.

FIG. 5 shows a frame structure in a Wibro system according to an embodiment of the present invention. According to the present invention, an FEC zone is added to the Wibro frame, and the DL_MAP contains information regarding the position of the FEC zone, which may or may not be adjacent to the existing multicasting zone.

Referring to FIG. 5, the FEC zone includes an FEC_MAP, which contains information regarding data packets, the error of which needs to be corrected by the FEC packet, and the transmission cycle of the FEC packet.

Figure 2:
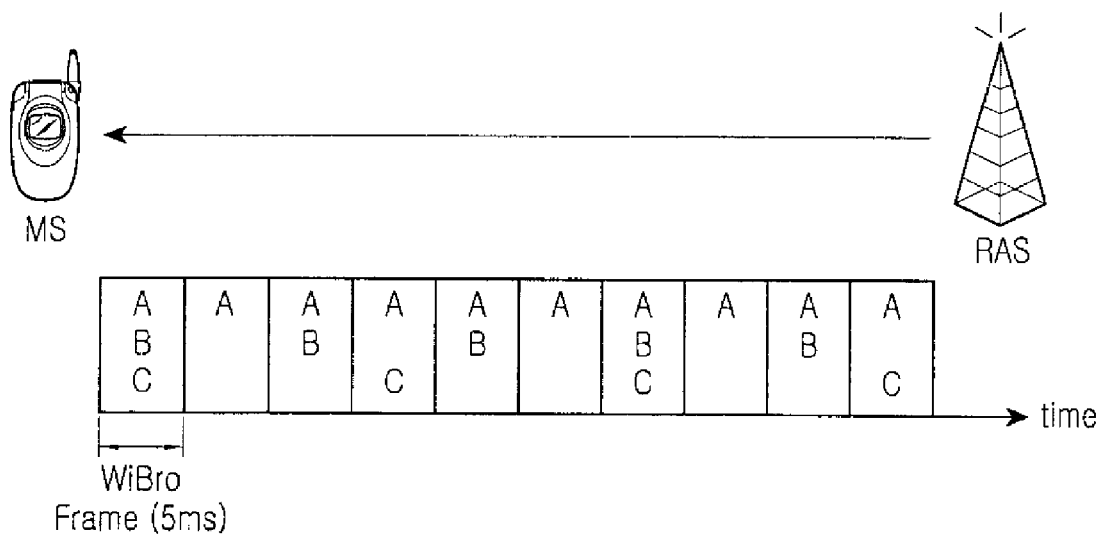
FIG. 2 shows an exemplary scheme of transmission of broadcasts from an RAS to an MS via frames in a conventional Wibro system.
Figure 6A:
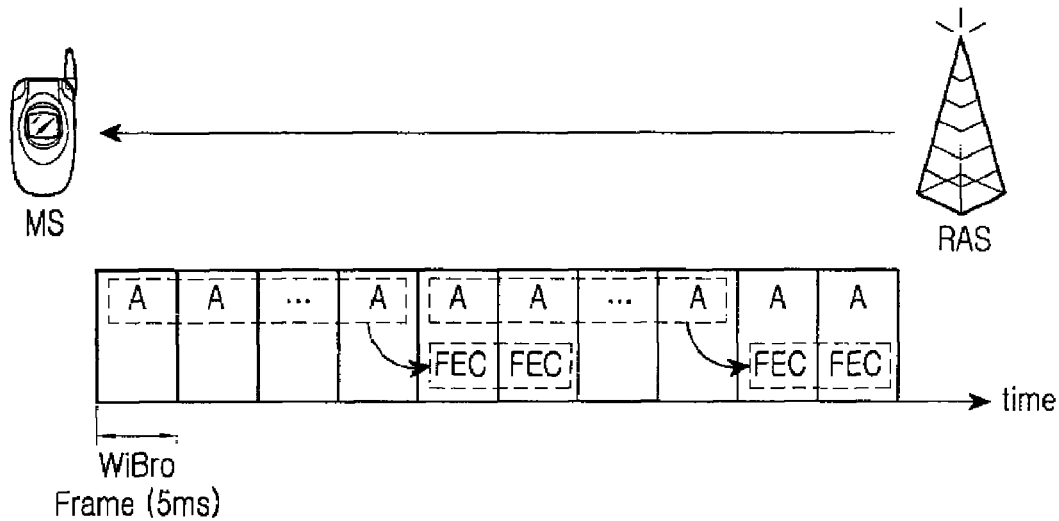
FIG. 6 shows exemplary schemes of transmission of broadcasts from an RAS to an MS via frames in a Wibro system according to an embodiment of the present invention.
Figure 6B:
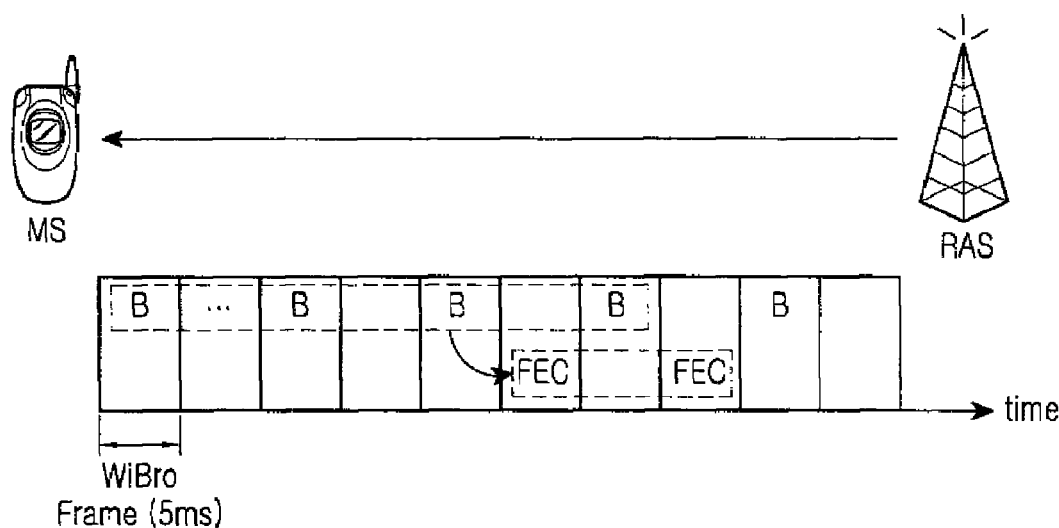

FIG. 6 shows exemplary transmission schemes of frames from an RAS to an MS in a Wibro system according to an embodiment of the present invention. Particularly, FIG. 6 shows examples of transmission of data packets and strategies for transmitting related FEC packets. Data packets have different transmission cycles for respective broadcasting channels, as has been described with reference to FIG. 2. What is important regarding the transmission of data packets and FEC packets is that the data packets and the FEC packets, which are used to correct errors of the data packets, must be transmitted via different frames. This is because, if data packets and related FEC packets are transmitted via the same frame, loss of the frame itself makes it difficult to recover data.

In FIG. 6, (a) corresponds to the transmission of data packets A via every frame. According to the embodiment of the present invention, FEC packets for correcting error in the data packets A are transmitted through frames different from the frames in which the corresponding data packets A are transmitted. Here, the FEC packets are not necessarily transmitted after the data packets for error correction have been transmitted. Alternatively, the FEC packets may be transmitted before the data packets are transmitted, wherein the transmitter may have a buffer for firstly transmitting the FEC packets.

In FIG. 6, (b) corresponds to the transmission of data packets B via every second frame. As explained above with reference to FIG. (a), data packets B and FEC packets for correcting error in data packets B are arranged not to be transmitted in the same frame.

Each MS may or may not incorporate the FEC function. Data in the FEC zone is additional data, which is used to recover lost data in the MRS zone (i.e. actual broadcast data), and is transmitted via an zone (i.e. outband) different from the MBS zone in the Wibro frame as mentioned above. This means that an MS having no FEC function can receive data for a broadcasting service only via a conventional MBS zone. An MS incorporating the FEC function can receive not only data in the MBS zone, but also data in the FEC zone for a better service. As such, the present invention has backward compatibility, i.e. it does not affect MSs having no FEC function.

As mentioned above, the data transmission/reception method for an MBS in a broadband wireless access system according to the present invention is advantageous in that packet losses occurring in wireless channels of a broadband wireless access network (e.g. Wibro) are compensated so that multimedia data of excellent quality can be transmitted in real time. This guarantees the provision of better services.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A data transmission method for an MBS (Multicast & Broadcast Service) in a broadband wireless access system, the method comprising the steps of:
   constructing first and second Wibro frames for non-simultaneous transmission, each having a structure comprising a downlink portion in which data is transmitted from a radio access station (RAS) to a plurality of mobile stations, temporally followed by an uplink portion in which data is transmitted from at least one mobile station to the RAS and downlink data is not transmitted by the RAS,
   wherein,
   the downlink portion of the first Wibro frame contains at least broadcast data containing packets of a broadcast channel; and
   the downlink portion of the second Wibro frame contains an FEC (Forward Error Correction) zone, the FEC zone containing an FEC packet corresponding to a data packet in the broadcast data of the first frame, for performing a packet-based FEC process on the corresponding data packet of the first frame; and
   transmitting, by the RAS, the first and second Wibro frames to the plurality of mobile stations.

2. The method as claimed in claim 1, wherein the first Wibro frame includes a DL_MAP (Downlink_MAP) portion containing an FEC_MAP that has information regarding a position of the FEC packet of the second frame.

3. A data reception method for an MBS (Multicast & Broadcast Service) in a broadband wireless access system, the method comprising the steps of:
   receiving, by a mobile station, first and second Wibro frames transmitted from a radio access station (RAS), each Wibro frame having been constructed with a structure comprising a downlink portion in which data is transmitted from the RAS to a plurality of mobile stations, temporally followed by an uplink portion in which data is transmitted from at least one mobile station to the RAS and downlink data is not transmitted;
   wherein,
   the downlink portion of the first Wibro frame contains at least broadcast data containing packets of a broadcast channel; and
   the downlink portion of the second Wibro frame contains an FEC (Forward Error Correction) zone, the FEC zone containing an FEC packet corresponding to a data packet in the broadcast data of the first frame, for performing a packet-based FEC process on the corresponding data packet of the first frame;
   recovering, by the mobile station, a lost data packet of the first Wibro frame using a corresponding FEC packet received by the mobile station in the second Wibro frame, the lost data packet having been lost during data reception via a wireless channel.

4. The method as claimed in claim 3, wherein the first Wibro frame includes a DL_MAP portion containing an FEC_MAP that has information regarding a position of the FEC packet of the second frame.

5. A Wibro system having a MBS server providing an MBS (Multicast & Broadcast Service) and a plurality of ACRs (Access Control Routers) in communication with the MBS server, comprising:
   a plurality of RASs (Radio Access Stations), in communication with one of the plurality of ACRs, configured to transmit first and second Wibro frames; and
   a plurality of mobile stations, in communication with the RASs, each configured to receive the first and second Wibro frames;
   wherein,
   the first and second Wibro frames each having a structure comprising a downlink portion in which data is transmitted from an RAS to a plurality of mobile stations, temporally followed by an uplink portion in which data is transmitted from at least one mobile station to the RAS and downlink data is not transmitted by the RAS,
   wherein,
   the downlink portion of the first Wibro frame contains at least broadcast data containing packets of a broadcast channel; and
   the downlink portion of the second Wibro frame contains an FEC (Forward Error Correction) zone, the FEC zone containing an FEC packet corresponding to a data packet in the broadcast data of the first frame, to enable a mobile station receiving the first and second Wibro frames to perform a packet-based FEC process on the corresponding data packet of the first frame.

6. The Wibro system of claim 5, wherein the Wibro frame includes a DL_MAP (Downlink_MAP) portion containing an FEC_MAP that has information regarding a position of the FEC packet of the second frame.

* * * * *